US008582088B2

(12) United States Patent
Bain et al.

(10) Patent No.: US 8,582,088 B2
(45) Date of Patent: Nov. 12, 2013

(54) AUTHENTICATION APPARATUS AND METHODS

(75) Inventors: Ian William Bain, West Lothian (GB);
David Faichnie, Lennoxtown (GB);
Ketil Karstad, Drammen (NO)

(73) Assignee: Innovia Films SARL, Lausanne (CH)

( * ) Notice: Subject to any disclaimer, the term of this patent is extended or adjusted under 35 U.S.C. 154(b) by 52 days.

(21) Appl. No.: 13/001,323

(22) PCT Filed: Jul. 1, 2009

(86) PCT No.: PCT/GB2009/050769
§ 371 (c)(1),
(2), (4) Date: Feb. 23, 2012

(87) PCT Pub. No.: WO2010/001165
PCT Pub. Date: Jan. 7, 2010

(65) Prior Publication Data
US 2012/0314207 A1    Dec. 13, 2012

(30) Foreign Application Priority Data
Jul. 1, 2008    (GB) .................................... 0811991.9

(51) Int. Cl.
*G06K 9/74*    (2006.01)
*G06K 9/00*    (2006.01)

(52) U.S. Cl.
CPC ................................. *G06K 9/00046* (2013.01)
USPC ........................................................... 356/71

(58) Field of Classification Search
CPC .............................. G06K 9/74; G06K 9/00046
USPC .......................................................... 356/71
See application file for complete search history.

(56) References Cited

U.S. PATENT DOCUMENTS

| 5,678,678 | A |  | 10/1997 | Brandt, Jr. et al. |  |
|---|---|---|---|---|---|
| 2002/0119660 | A1 | * | 8/2002 | Sarfaty et al. | 438/689 |
| 2002/0176098 | A1 | * | 11/2002 | Neily et al. | 356/630 |
| 2006/0176494 | A1 | * | 8/2006 | Finarov | 356/630 |
| 2011/0043821 | A1 | * | 2/2011 | Stewart | 356/504 |

FOREIGN PATENT DOCUMENTS

| EP | 0080309 | 1/1983 |
|---|---|---|
| WO | 2005/032831 | 4/2005 |

OTHER PUBLICATIONS

International Preliminary Report on Patentability and Written Opinion of the International Searching Authority of International Application No. PCT/GB2009/050769 filed on Jul. 1, 2009.
International Search Report of International Application No. PCT/GB2009/050769.

* cited by examiner

*Primary Examiner* — Michael P Stafira
(74) *Attorney, Agent, or Firm* — Ping Wang; Andrews Kurt LLP (57) ABSTRACT

Authentication apparatus (1, 100) and methods which authenticate an item (4, 110) responsive to the detection that a portion of the item has one or more predetermined characteristics, the said predetermined characteristics comprising either or both the thickness of the said portion of the item, and the thickness of one or more layers within the said portion of the item, determined by optically-based thickness measuring apparatus (6, 102-108). The item may be a product and the portion of the item may be a sheet of packaging material. The item may be a security document and the portion of the item may be a sheet of security document substrate.

17 Claims, 3 Drawing Sheets

AUTHENTICATION APPARATUS AND METHODS

FIELD OF THE INVENTION

The invention relates to the authentication of items such as security documents and products which may be at risk of being counterfeited.

BACKGROUND TO THE INVENTION

The background to the invention will now be set out with reference to the example applications of the authentication of security documents incorporating (typically printed on) a light permeable sheet of substrate material. However, the invention may be applied more generally to the authentication of other items, at least a portion of which has a thickness which is measurable using an optical thickness measurement.

Within this specification and the appended claims, by "security document(s)" we include documents of value, such as bank notes and bearer bonds; payment tokens, such as credit and debit cards and vouchers; certificates and identification documents, such as passports, driving licenses and identity cards. By the authentication of a security document, we refer to verification to a suitable level of certainty, which is typically less than 100%, that a security document originates from a prescribed or authorised source.

It is well known to provide security documents that include security elements, such as magnetic strips, special inks, print which is difficult to reproduce, optical features, such as holograms or diffraction gratings, and tamper-resistant electronic devices. Some security elements are overt to the human eye and some are covert, requiring knowledge of the element or special equipment to detect. Security documents are typically printed onto or embedded into a sheet of substrate material, such as a sheet of an appropriate paper, or plastics material, and it is known to provide apparatus to automatically authenticate documents by detecting security elements which have been introduced into or onto a sheet of substrate material.

However, standalone apparatus suitable for the authentication of security documents at points of sale is only in limited use at the present time. Points of sale may have a UV light source for detecting a fluorescent ink on a bank note, or a pen which does not mark authentic bank notes. These devices do not provide a high technical hurdle to counterfeiters. Points of sale may also have electronic apparatus which authenticates a credit or debit card using a tamper-resistant electronic circuit embedded in the card. However, this apparatus is complex and expensive, requires time to process and a telecommunications link to a remote server, and is not suitable for use in the authentication of bank notes during routine cash transactions.

More sophisticated apparatus for checking the authentication of bank notes is in common use by credit institutions and professional cash handlers for checking bank notes which are to be returned to circulation, but such apparatus is expensive, particularly as it is generally necessary to check for the presence of multiple security features to authenticate a bank note. Cash receiving machines have less sophisticated authentication apparatus as they have to be kept to a relatively low cost.

Some embodiments of the present invention aim to provide authentication apparatus and methods which can be implemented in a reasonably priced, reliable way such as to be suitable for use at a point of sale, or in a cash receiving machine. Some embodiments of the present invention aim to measure new or alternative properties of a security document, such as a bank note, to facilitate automatic authentication of security documents, or to present an additional hurdle to counterfeiters by providing one or more additional features which a counterfeit security document must have in order to be incorrectly determined to be authentic.

The invention makes use of known sheets of security document substrate which are permeable to electromagnetic radiation, for example, transparent in the visible region of the electromagnetic spectrum. It is known to create security documents, such as banknotes, by printing opaque inks onto sheets of transparent plastics substrate material, leaving a transparent window. The resulting window provides an overt security feature which is conspicuous to the human eye. It is known to print, etch or embed additional optical security features, such as optically variable devices formed by diffraction gratings, onto or into the resulting transparent windows, to provide additional overt security features. It is possible to provide automatic authentication apparatus which can determine authenticity from the presence or absence of these additional optical security features, but such apparatus is typically complex and expensive.

Some embodiments of the invention aim to use windows which have been left permeable to electromagnetic radiation (and typically transparent in the visible region of the electromagnetic spectrum) on security documents made from sheets of plastics substrate material which are permeable to electromagnetic radiation (and typically transparent in the visible region of the electromagnetic spectrum), to thereby provide one or more measurable characteristics which can be taken into account when determining whether a security document is authentic.

Some embodiments of the invention aim to provide sheets of substrate material for security documents which are adapted to facilitate authentication by the optical measurement of the thickness of one or more layers within the sheets of substrate material, as well as security documents include the said sheets of substrate material.

The invention also addresses the problem of authenticating products which may be counterfeited, such as alcoholic drinks, watches and other items of jewelry, perfumes, branded clothing, pharmaceuticals and cigarettes. It is well known to provide optically detectable security features, such as holograms, to be incorporated into the packaging of products, or into the products themselves. These optically detectable security features may be detected by the human eye, or by automatic authentication apparatus. However, features which are visible to the human eye can often be duplicated and the automatic authentication apparatus used to detect some known security features can be expensive.

Accordingly, some embodiments of the invention aim to provide alternative or improved methods and apparatus for authenticating products which may be counterfeited.

Furthermore, where overt optical security features are provided in or on products and security documents, they will be apparent to counterfeiters who can then address the problem of trying to reproduce the security feature. Some embodiments of the invention aim to authenticate items, such as products which may be counterfeited, or security documents, by measurement of an optical characteristic which is not readily apparent to the human eye, which may make it difficult for counterfeiters to determine which features are being verified during authentication.

SUMMARY OF THE INVENTION

According to a first aspect of the present invention there is provided authentication apparatus operable to determine the authenticity of an item responsive to the detection that a portion of the item has one or more predetermined characteristics, the said predetermined characteristics comprising either or both the thickness of the said portion of the item, and the thickness of one or more layers within the said portion of the item, determined by optically-based thickness measuring apparatus.

Thus, the authentication apparatus takes into account an inherent characteristic of the item (either or both the thickness of the said portion of the item and the thickness of one or more layers of the said portion of the item), rather than relying solely on the presence or absence of security features printed onto or incorporated into the item. This presents a technical difficulty to counterfeiters who, in order to cause the authentication apparatus to falsely authenticate a counterfeit document, would need to provide an item having a portion with the same thickness (where the thickness of the said portion of the item is taken into account) and a corresponding layer structure, (where the thickness of one or more layers of the said portion of the item is taken into account). Furthermore, this enables authentication apparatus to be provided which can authenticate a plurality of different items incorporating the same material, for example, security documents (e.g. banknotes of a variety of denominations or designs, or relating to different currencies) which are printed on substrate from the same (usually controlled) source, for example by different security printers, or products packaged in a sheet of material from the same source.

The item may be a product selected from a group comprising a container of alcoholic drink, an item of jewelry (e.g. a watch), a container of perfume, an item of clothing, a container of pharmaceuticals and container of cigarettes.

The said portion of the item may be an integral part of the product. However, typically the item is a packaged product, comprising both a product (such as a product selected from the group specified above) and packaging. In this case, the said portion of the item is typically the packaging, or a portion of the packaging, such as a sheet of electromagnetic radiation-permeable material.

Typically, the said portion of the item is a sheet of material. Thus, the invention extends to authentication apparatus operable to determine the authenticity of an item comprising a sheet of material responsive to the detection that the sheet of material has one or more predetermined characteristics, the said predetermined characteristics comprising either or both the thickness of the sheet of material, and the thickness of one or more layers within the sheet of material, determined by optically-based thickness measuring apparatus.

The item may be a security document comprising a sheet of substrate material, and said portion of the item may be the sheet of substrate material, or a portion of the sheet of substrate material. Accordingly, the invention extends to authentication apparatus operable to determine the authenticity of a security document comprising a substrate responsive to the detection that a security document has one or more predetermined characteristics, the said predetermined characteristics comprising either or both the thickness of the substrate of a security document, and the thickness of one or more layers of the substrate of a security document, determined by optically-based thickness measuring apparatus.

In order to minimise the complexity of the authentication apparatus, the predetermined characteristics may comprise only optically measurable characteristics of the sheet of material. However, the predetermined characteristics of an item which are taken into account when determining the authenticity of the item may further comprise predetermined characteristics of features printed onto, or introduced into, the sheet of material.

The predetermined characteristics may further comprise the birefringence of a sheet of material. This is advantageous as it is technically difficult to provide a sheet of material with no, or minimal birefringence, particularly a multi-layer sheet of plastics substrate material, suitable for use a security document substrate.

By using optically-based thickness determining apparatus, the thickness of a sheet of material, or one or more layers of a sheet of material, can be determined without destruction of the sheet of material. Typically, the apparatus is employed to authenticate items which comprise a sheet of material and one or more optical security features which are printed onto or incorporated into, the sheet of material.

The sheet of material should be permeable to electromagnetic radiation (such as visible light) and is preferably transparent. By transparent we refer to the property of allowing sufficient light in the visible region of the spectrum to be transmitted to enable an image to be clearly seen through the sheet of material and include sheets of material which fulfil this criteria but are tinted or partially reflective. However, the sheet of material is typically substantially clear. The sheet of material may transmit at least 90% of visible light which is incident normal to the surface.

The authentication apparatus may be used to authenticate security documents which are opaque across the majority (typically the substantial majority) of their surface area, with only a minority of the security document being light permeable. For example, the security documents may be opaque except for one or more transparent windows. The security documents typically comprise a light permeable, and preferably transparent, sheet of substrate material, the majority of which is covered with an opaque material.

The said characteristics may include the presence of an optically permeable region of a security document (for example, a window which has been left transparent) and the authentication apparatus may be adapted to determine whether there is a region of a received security document which is permeable to electromagnetic radiation of a predetermined range of frequencies (e.g. transparent). The predetermined range of frequencies typically include some or all of the visible region of the electromagnetic spectrum, and optionally some of the near infra-red region of the electromagnetic spectrum. The authentication apparatus may determine whether there is a region of a received security document which is permeable to electromagnetic radiation of a predetermined range of frequencies by determining whether there is both a region which is permeable to electromagnetic radiation of a predetermined range of frequencies and a region which is opaque to electromagnetic radiation of the predetermined range of frequencies. Whether or not there is a region which is optically permeable may be determined by determining whether a thickness measurement can be made. A source of electromagnetic radiation and a detector of electromagnetic radiation may be provided to determine whether or not there is a region which is not permeable to electromagnetic radiation of the predetermined range of frequencies.

The one or more predetermined characteristics may comprise or consist of the overall thickness of a sheet of material. The one or more predetermined characteristics may comprise or consist of the overall thickness of a sheet of material, except for a surface coating layer on one or both opposite faces of the sheet of material. The one or more predetermined characteristics may comprise or consist of the overall thickness of the sheet of material plus an electromagnetic radiation permeable coating on one or both faces of the sheet of material. The latter two options are especially relevant where the item is a security document and the sheet of material is a sheet of substrate material.

The one or more predetermined characteristics may comprise or consist of the thickness of an individual layer within a portion of an item (such as a sheet of material) having a plurality of layers. The said individual layer may be located between at least one layer on each side of the said individual layer. This presents a technical challenge to a counterfeiter who is then required to prepare a portion of an item (such as a sheet of material) which includes a layer of defined thickness within the body of an item. The predetermined characteristics may comprise or consist of the thickness of two or more said individual layers within a portion of an item having a plurality of layers (such as a multi-laminate sheet of material).

The one or more predetermined characteristics may comprise or consist of the combined thickness of a group of adjacent layers within a portion of an item (such as a sheet of material) having both the group of adjacent layers and at least one further layer. The combined thickness of a group of adjacent layers may, for example, be measured using interferometric methods based on the interference between electromagnetic radiation reflected from interfaces at either end of the group of adjacent layers. The group of adjacent layers may be located within a sheet of material having at least one further layer on each side (normal to the plane of the substrate) of the group of adjacent layers. The predetermined characteristics may comprise or consist of the thickness of two or more said individual layers within a portion of an item having a plurality of layers, such as the thickness of two or more said individual layers within a sheet of multi-laminate material.

The predetermined characteristics may comprise or consist of the thicknesses of each of a plurality of layers, or groups of adjacent layers (which groups may overlap) which generates a measurable signal, due to the reflection of electromagnetic radiation, in excess of a threshold value.

Preferably, the thickness measuring apparatus comprises a source of electromagnetic radiation, for example a source of white light, and a detector of electromagnetic radiation, for example a spectrometer, for detecting electromagnetic radiation from the source of electromagnetic radiation which has interacted with an electromagnetic radiation permeable portion of the item. This enables thickness measurements to be carried out, as electromagnetic radiation which is incident on the surfaces of an item, such as an item comprising a sheet of material, and the boundaries between layers within a sheet of material, is reflected, and may also have its polarity altered as a result. Typically, the source of electromagnetic radiation generates electromagnetic radiation in the visible part of the spectrum, and a detector of electromagnetic radiation detects electromagnetic radiation in the visible part of the spectrum. The source, and detector, may also emit and detect, respectively, light in the near infra-red part of the spectrum.

Preferably, the detector of electromagnetic radiation is configured to measure electromagnetic radiation which has been reflected from a region of the item which is permeable to electromagnetic radiation of a predetermined range of frequencies. However, where the thickness of a sheet of material, or one or more layers within a sheet of material, is measured the detector of electromagnetic radiation may be arranged on an opposite side of a received sheet of material to the source of electromagnetic radiation, so as to detect electromagnetic radiation which has been transmitted through the sheet of material. Generally, fewer reflections are required to produce an interference pattern at the detector when reflected electromagnetic radiation is analysed.

Preferably, the source of electromagnetic radiation is operable to direct electromagnetic radiation of a predetermined range of wavelengths onto the item, and the detector is operable to measure electromagnetic radiation of a predetermined range of frequencies. Typically, the source of electromagnetic radiation will be operable to emit broadband electromagnetic radiation (e.g. white light). Typically also, the detector will be operable to measure the intensity of electromagnetic radiation at a range of wavelengths simultaneously. For example, the detector may be a spectrometer. However, the light source may be operable to generate electromagnetic radiation at a range of wavelengths at different times, for example to sweep the wavelength of generated electromagnetic radiation from one wavelength value to another wavelength value. In this case, the detector may be wavelength independent. Similarly, the detector could in principle be operable to detect electromagnetic radiation of a range of different wavelengths at different times.

Accordingly, the optically-based thickness measuring apparatus typically functions as a broadband (e.g. white) light interferometer. An advantage of using broadband light interferometry is that it is possible to measure the thickness of more than one layer, or groups of adjacent layers, within an item simultaneously, by looking for interference caused by reflection from different pairs of interfaces between adjacent layers. However, alternative optically-based thickness measuring apparatus may be employed based on techniques known to those skilled in the art for measuring the thickness of films, such as ellipsometry or spectral reflectance, or by using a prism coupler, or by measuring the net amount of absorption of electromagnetic radiation (e.g. electromagnetic radiation in the infra-red part of the spectrum) or beta radiation through the item.

The predetermined characteristics may include the lack of layers, or groups of layers, having thicknesses which would not be present in an authentic document. The predetermined characteristics may comprise whether the layer structure within a sheet of material is symmetrical. This may be determined from the lack of intensity peaks which should not be present, and the relative intensity of peaks. Where two separate layers of the same thickness are present in a symmetrical sheet of material, a more intense peak corresponding to that thickness should be present than when only one layer of that thickness is present.

The predetermined characteristics may include characteristics related to the relative intensity of reflections from one or more interfaces on the surface of an item, or between layers within the item. This provides an additional distinguishing characteristic to use in authentication. The relative intensity of reflections may be determined from the relative intensity of interference between electromagnetic radiation reflected from different pairs of interfaces, for example, using broadband light interferometry.

The apparatus is typically adapted (e.g. pre-programmed) to recognise predetermined characteristics of a portion of an item with specific properties, such as a specific thickness, the presence of layers having specific thicknesses, and/or a specific birefringence. Thus, the apparatus may be adapted to recognise a specific portion of an item, such as a sheet of material. The apparatus may be adapted to recognise a sheet of material made from biaxially-oriented polypropylene (BOPP). Preferably, the apparatus is adapted to recognise a multi-layer sheet of material, all or most of which is made from BOPP. The apparatus may be adapted to authenticate security documents according to the fourth aspect of the invention, discussed below.

The invention also extends in a second aspect of the present invention to a method of determining the authenticity of an item wherein the method comprises detecting whether a portion of the item has one or more predetermined characteristics, the said predetermined characteristics comprising either or both the thickness of the said portion of the item, and the thickness of one or more layers within the said portion of the item, determined by optically-based thickness measuring apparatus.

The item may be a product selected from a group comprising a container of alcoholic drink, an item of jewelry (e.g. a watch), a container of perfume, an item of clothing, a container of pharmaceuticals and container of cigarettes.

The said portion of the item may be an integral part of the product. However, typically the item is a packaged product, comprising both a product (such as a product selected from the group specified above) and packaging. In this case, the said portion of the item is typically the packaging, or a portion of the packaging, such as a sheet of material which is permeable to electromagnetic radiation.

Typically, the said portion of the item is a sheet of material. Thus, the invention extends to a method of authenticating an item comprising a sheet of material, the method comprising detecting whether the sheet of material has one or more predetermined characteristics, the said predetermined characteristics comprising either or both the thickness of the sheet of material, and the thickness of one or more layers within the sheet of material, determined by optically-based thickness measuring apparatus.

The item may be a security document comprising a sheet of substrate material, and said portion of the item may be the sheet of substrate material, or a portion of the sheet of substrate material. Accordingly, the invention extends to a method of authenticating a security document comprising a sheet of substrate material, the method comprising detecting whether the sheet of substrate material has one or more predetermined characteristics, the said predetermined characteristics comprising either or both the thickness of the sheet of substrate material, and the thickness of one or more layers within the sheet of substrate material, determined by optically-based thickness measuring apparatus.

The authenticity of the item is preferably determined using authentication apparatus according to the first aspect of the invention. Optional features of the authentication apparatus, method of operation of the authentication apparatus and the items which are authenticated by the method of the second aspect correspond to those discussed in relation to the first aspect of the invention.

According to a third aspect of the present invention there is provided a sheet of substrate material for a printed security document, the sheet of substrate material comprising a plurality of layers of material which is permeable to electromagnetic radiation (and typically transparent in the visible region of the electromagnetic spectrum), wherein two adjacent layers have significantly different refractive indices. One said layer may comprise a polymer and the second said layer may comprise the same polymer with the addition of an additive which affects (typically increases) the refractive index of the polymer, such as titanium dioxide. The sheet of substrate material may comprise first, second and third layers, the first and third layers having substantially the same refractive index as each other, second layer being located intermediate and in contact with the first and third layers and having a higher refractive index than the first and third layers to reflect incident electromagnetic radiation. In this case, the first and second layers are preferably substantially thicker than the third layer. Thus, the first and second layers can be selected to obtain desired physical characteristics and the third layer can be selected to enhance reflection and improve measurements of the thickness of the first, second or third layers, or one or more groups of adjacent layers including the first, second or third layers.

The first and third layers may comprise biaxially-oriented polypropylene (BOPP). The second layer may also function as an adhesive to join the first and third layers.

The invention also extends in a fourth aspect to a security document, such as a document of value, comprising a sheet of substrate material according to the third aspect of the invention, the surface of which is predominantly printed with ink which is opaque in the visible region of the spectrum except for a window which is permeable to a visible light where the thickness of one or more layers including the first layer, the second layer or, where present, the third layer, can be measured.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
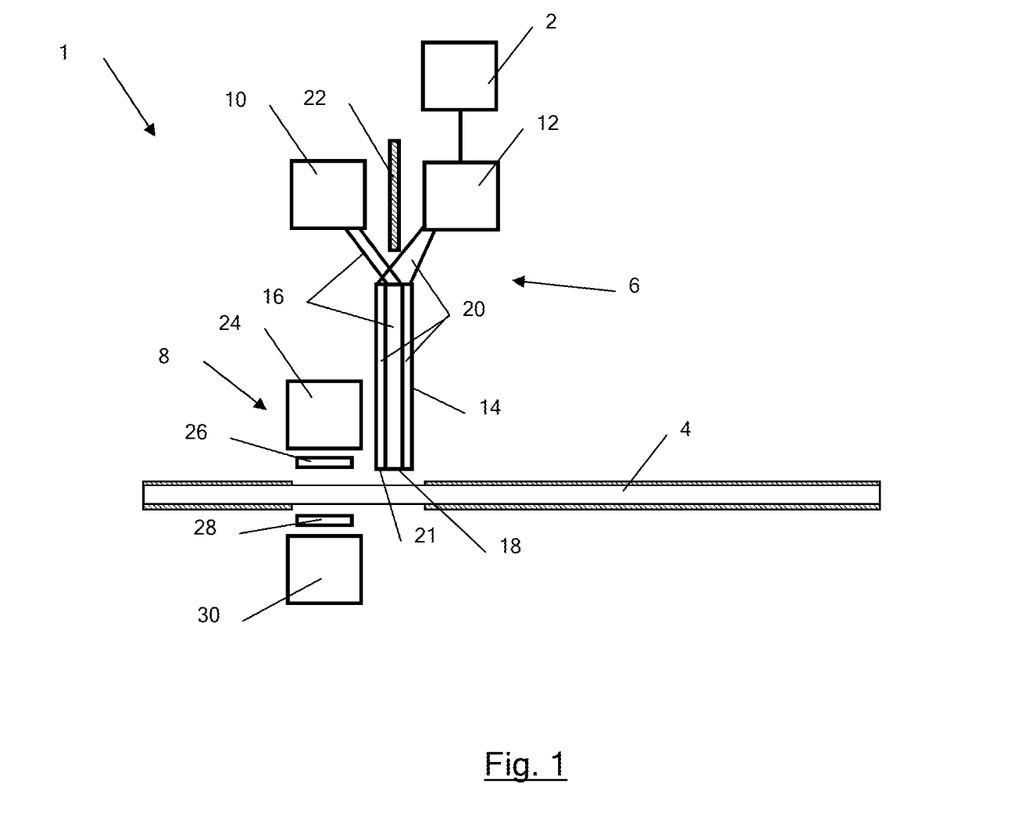
FIG. 1 is a schematic diagram of authentication apparatus according to the invention.

With reference to FIG. 1, authentication apparatus, shown generally as 1, comprises a computer 2 for determining the authenticity of an item, in this case a security document 4. The computer generates a signal indicative of the detection of an authentic document in response to the detection of a security document having a number of predetermined identifying characteristics. The predetermined identifying characteristics comprise, or potentially consist only of, optically discernible properties. In this example, the authentication apparatus comprises first optical detection apparatus 6, which functions as a broadband light interferometer and is operable to measure the thickness of a sheet of substrate material, and some layers and combinations of layers within the sheet of substrate material, and second optical detection apparatus 8, which measures the birefringence of a sheet of substrate material.

The first optical detection apparatus comprises a halogen bulb 10, which functions as a broadband source of electromagnetic radiation, and a spectrometer 12, which functions as a detector of electromagnetic radiation. A bifurcated fibre optic bundle 14 comprises a first fibre optic cable 16 for conducting electromagnetic radiation from the halogen bulb to an output terminal 18 of the first fibre optic cable and the output terminal is arranged to illuminate a security document (when present) with electromagnetic radiation from the halogen bulb. The bifurcated fibre optic bundle also comprises second fibre optic cables 20 which receive electromagnetic radiation reflected from the security document, at an input end 21 of the second fibre optic cables, and conduct the received electromagnetic radiation to the spectrometer for spectral analysis. The first optical detection apparatus thereby functions as a broadband (e.g. white) light interferometer. Electromagnetic radiation is directed onto the sheet of substrate material substantially normal to the surface and electromagnetic radiation which is reflected substantially normal to the surface is detected. A heat reflecting shield 22 is provided between the halogen bulb and the spectrometer, to protect the spectrometer from the heat generated by the halogen bulb.

The authentication apparatus is configured to receive a security document comprising opaque material printed on the majority of the surface of a transparent substrate, with at least one window through which electromagnetic radiation can penetrate the substrate. A security document may be received in a slot or guide such that, when the security document is located in position, the first optical detection apparatus is arranged to direct electromagnetic radiation onto a window which is transparent in the visible region of the spectrum. The security document could be conducted past or through the authentication apparatus by way of a conveyor such that a transparent window of each successive security document passes the first optical detection apparatus in turn.

In use, the spectrometer produces output signals which are indicative of (e.g. proportional to, or proportional to the square of) the intensity of electromagnetic radiation which is received by the spectrometer at a range of wavelengths. The range of wavelengths is typically a plurality of discrete wavelengths. The spectrometer comprises a narrow input slit through which received electromagnetic radiation diffracts, and an array of charge coupled device (CCD) detector elements arranged to measure the intensity of electromagnetic radiation at different wavelengths. Other types of detector may be employed, such as back-thinned CODs, complementary metal oxide semiconductor detector (CMOS), n-type metal oxide semiconductor array (NMOS), or an indium gallium arsenide (InGaAs) photovoltaic detector array. The measurements from the spectrometer are transferred to the controller which carries out digital data processing, which is discussed further below, to determine the thickness of the substrate, layers within the substrate, and groups of adjacent layers with the substrate. Instead of a narrow input slit, the spectrometer may use a cross-section converter, which takes each fibre in the input bundle and arranges them in a one-dimensional array to emulate a narrow slit. We have found that this increases the sensitivity of the measurement technique, and is especially helpful when trying to determine the presence of a layer which is embedded within a sheet of substrate material.

The second optical detection apparatus, comprises a second source of electromagnetic radiation 24 and crossed first and second polarisers 26, 28, which are spaced apart to receive a security document therebetween, and which are rotated continuously in use at the same speed and in the same direction. A further spectrometer 30 receives electromagnetic radiation which has passed through the crossed polarisers and a security document received between the polarisers. The second optical detection apparatus is also located to direct electromagnetic radiation through a window in a received security document. The transmission of electromagnetic radiation through the crossed first and second polarisers is a function of the thickness of the substrate, the birefringence of the sheet of substrate material and wavelength. The thickness of a received sheet of substrate material can be measured by the first optical detection apparatus and the birefringence of a sheet of substrate material can then be determined from the variation with wavelength of the relative transmission of electromagnetic radiation, measured by the spectrometer. If the security documents to be authenticated are printed on a sheet of substrate material which has a minimal or zero birefringence, such as a sheet of multilayer BOPP substrate material formed by the bubble method or Stenter method, which are known to those skilled in the art, the variation in relative transmission of electromagnetic radiation with wavelength is minimal. In this case, the spectrometer may be replaced with a detector which measures the intensity of transmitted electromagnetic radiation at only a small number of discrete wavelengths.

Data Processing

The computer receives measured data from the spectrometer of the first optical detection apparatus indicative of the intensity of reflected electromagnetic radiation at a range of different wavelengths. The measured data is processed to determine the thickness of the substrate and, if present, the thickness of some layers and groups of adjacent layers. These measurements are possible because electromagnetic radiation which is reflected from two different interfaces, and which is sufficiently coherent (e.g. because it comes from the same source) will interfere. Where the source of electromagnetic radiation and electromagnetic radiation detector are fixed, the resulting interference means that the intensity varies with wavelength. The detected intensity can be described by the following simplified formula, where $\delta = 2k_0 nd \cos \theta_r$:

$$I = I_1 + I_2 + 2\sqrt{I_1 I_2} \cos \delta$$

($\theta_r$ is the angle of the incident rays after refraction at the first interface of the substrate which they encounter; d is the distance between two parallel interfaces from which electromagnetic radiation is reflected; $k_0$ is the wave number of the incident electromagnetic radiation (i.e. $2\pi$ divided by the wavelength), n is the refractive index of the first layer through which electromagnetic radiation passes; $I_1$ and $I_2$ are the intensities of the electromagnetic radiation reflected from the first and second interfaces which interfere to form a net measured intensity I).

In the present example, the sample is illuminated at normal incidence and a further phase change of $\pi$ must be taken into account so that:

$$\delta = \frac{4\pi nd}{\lambda} \pm \pi$$

Thus, the relative reflectance from the substrate will vary cyclically with wavenumber (reciprocal of wavelength) and the distance between two interfaces, enabling the distance between two interfaces to be determined from the frequency of the cyclic variation in relative reflectance with wavenumber. Where measurable interference is generated by reflection from a number of different pairs of interfaces, the measured relative reflectance spectrum will include a corresponding number of different, superimposed, cyclically variable terms with different spatial frequencies. In order to determine the distance between each pair of interfaces which is generating measurable interference, a data set comprising appropriately normalised relative reflection readings at a range of different wavenumbers is transformed into a frequency domain, for example, using a fast Fourier transform and appropriately scaled to produce a data set of power versus thickness. Peaks in the resulting data set indicate the distance between pairs of interfaces which are generating measurable interference in the measured substrate, and thus the thickness of layers, or groups of adjacent layers, in the measured substrate.

Figure 2:
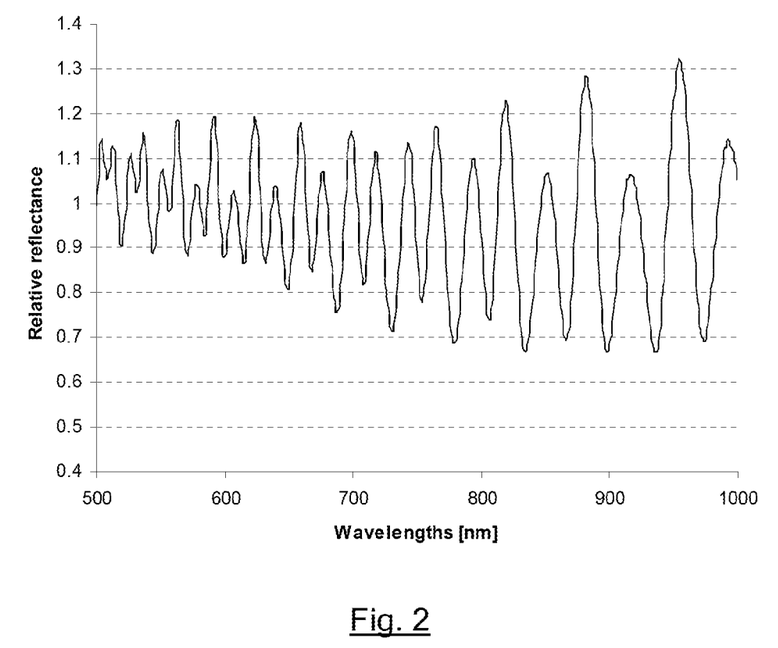
FIG. 2 is a graph of measured relative reflectance with wavelength for electromagnetic radiation reflected from a two-layer substrate.
Figure 3:
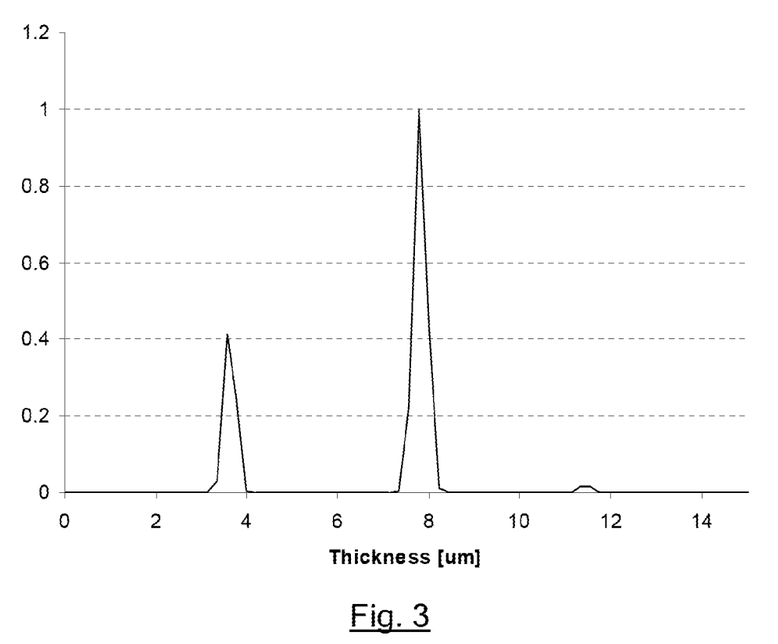
FIG. 3 is a plot of power spectral density versus thickness obtained by a sequence of data processing steps, including a Fourier transform, from the data illustrated in FIG. 2.

By way of example, FIG. 2 illustrates the relative reflectance for detected electromagnetic radiation of a range of wavelengths which has been reflected by a two-layer substrate which is 11.5 µm thick comprising a first layer which is 3.5 µm thick and a second layer which is 8 µm thick. It can be seen that the relative reflectance oscillates with a higher frequency component resulting from interference between the interfaces which are 8 µm apart, and a lower frequency component resulting from interference between the interfaces which are 3.5 µm apart. FIG. 3 illustrates the resulting plot of power spectral density versus thickness.

In the case of a multi-layer sheet of substrate material, interference between electromagnetic radiation reflected from each pair of two interfaces will lead to an intensity peak at a location in the frequency domain which corresponds to the spacing between those interfaces. Where there are two pairs of interfaces which are separated by the same distance, the resulting intensity maximum in the frequency domain are superimposed, giving a combined peak. The expected peaks, their expected relative strengths, and the layers whose combined thickness defines the spacing between those interfaces, are set out in the characteristic of a sheet of substrate material with a given layer structure.

Authentication

The computer assesses whether a security document is authentic by determining whether a security document has specified characteristics. In this example, the computer takes into account the analysed intensity versus thickness data and determines whether peaks are present which indicate that the substrate of a security document has characteristic distances between reflecting surfaces, and therefore whether the thickness of the substrate as a whole, and specific layers and groups of layers within the substrate, have predetermined thicknesses. Thus, the computer takes into account the presence of expected peaks in the intensity versus thickness data when assessing whether a security document is authentic. The computer may also take into account the relative intensity of peaks and/or the lack of other peaks when determining authenticity.

The computer also takes into account whether the measured birefringence of the substrate is within a predetermined range, in this case whether the measured birefringence is minimal, when determining whether to generate a signal indicating that the security document is believed to be authentic.

Variations

By measuring both birefringence and the thickness of the substrate and optionally one or more layers, or groups of layers, within the substrate, a considerable technical challenge is presented to potential counterfeiters. The apparent thickness determined by the methods described above can be affected by the birefringence of a substrate, which affects the interference between reflections from spaced apart interfaces. A sufficiently anisotropic substrate will appear to have a different thickness and so a measurement that a substrate has a sufficiently low birefringence can also be used to validate the thickness measurement. In an alternative embodiment, if the first optical detection apparatus employs a spectrometer of sufficiently high resolution, the measured variation in relative reflectance with wavelength can be used to provide a measure of both the thickness of a substrate (and optionally the thickness of layers and/or groups of layers within the substrate) and the birefringence of the substrate in a single reading, without a requirement for the second optical detection apparatus.

The authentication apparatus can be configured to receive a security document which is manually inserted into a slot or other guide, or configured to analyse security documents which are transported past the optical detection apparatus, for example by a conveyor. Because the first optical detection apparatus measures reflected electromagnetic radiation, it is possible to provide authentication apparatus having a window against which an electromagnetic radiation-permeable portion of a security document is manually pressed in use. This avoids the need to guide a security document between a source and detector of electromagnetic radiation. In this case, it may also be preferable to determine birefringence from reflected electromagnetic radiation, or to dispense with any measurement of birefringence.

Optionally, a window (not shown) may be provided between the output terminal of the first fibre optic cable and the substrate. Where present, the window is of known thickness and thereby functions to provide a reference with which measured thickness and intensities can be compared. Thus, measured thickness and intensities can be calibrated by reference to measurements resulting from reflections at the upper and lower interfaces of the window.

In the example embodiment, no focussing optics are provided between the output terminal of the first fibre optic cable and the substrate, in order to prove low cost apparatus and to obtain a signal from a reasonably expansive region of the substrate. However, where preferred, ancillary focussing optics, such as a lens, may be introduced between the output terminal of the first fibre optic cable and the substrate, to focus the incident electromagnetic radiation onto, or at a desired depth within, the substrate.

Figure 4:
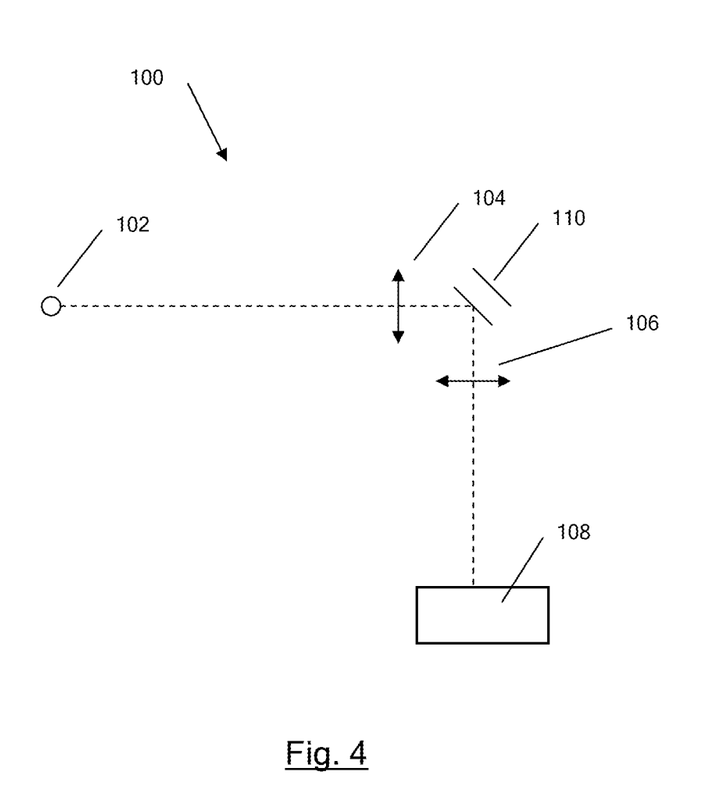
FIG. 4 is a schematic diagram of authentication apparatus based on a wavefront sensor.

One skilled in the art will appreciate that the thickness of a sheet of material, or a portion of an item, can be measured in a number of different ways. FIG. 4 is a schematic diagram of alternative thickness measuring apparatus, based on the principle of wavefront sensing, which could be used instead of white light interferometry. The alternative thickness measuring apparatus 100, comprises a source of electromagnetic radiation 102, such as a relatively low cost laser diode, or a light-emitting diode, focusing optics including a first lens 104 and a second lens 106, and a detector of electromagnetic radiation 108, such as a two-dimensional CCD array. The source of electromagnetic radiation is focused by the first lens, nominally on to the top surface of the item 110 (such as a sheet of material), the thickness of which is to be measured. If one of the surfaces within the item (such as an interface between two layers within a sheet of material), of the electromagnetic radiation is focused on the interface with the most severe roughness. Each interface within the item generates a Fresnel reflection, which is then imaged on to the detector using the second lens.

Figure 5:
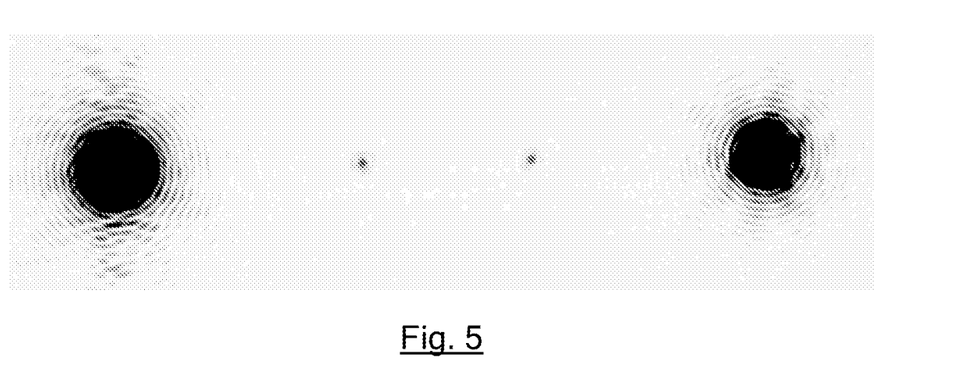
FIG. 5 is example data from a laminated glass sample analysed using the authentication apparatus of FIG. 4.

The reflections from the layer structure within the item to be authenticated should be a set distance apart, and the surface reflections can be detected to ensure that they correspond to the anticipated thickness, or thicknesses, characteristic of an authentic item. FIG. 5 illustrates example output from a laminated glass sample, using apparatus according to FIG. 4, which shows a three layer structure (leading to the appearance of four reflections), and the corresponding distance in the horizontal axis gives a measure of the thickness of the substrate.

In order to facilitate authentication by apparatus according to the invention, security documents may be formed from (e.g. printed on) substrates having an internal layer, which could function as an adhesive, having a significantly higher refractive index than the layers on either face of the internal layer. This could be achieved by including a suitable chemical species, such as titanium dioxide, in the material from which the internal layer is formed. This would increase the amount of reflection from the internal layer and facilitate authentication by the methods described herein. The intensity of the peaks resulting from the interference between pairs of interfaces including the interfaces of the modified layer could also be compared with the intensity of peaks resulting from the interference between other pairs of interfaces, providing a further measurable characteristic which can be used to determine whether a security document is authentic.

Although the example described above relates to the authentication of a security document comprising a sheet of substrate material, the same principles can be applied to authenticate other items. For example, valuable products, such as alcoholic drinks, watches and other items of jewelry, perfumes, branded clothing, pharmaceuticals and cigarettes, may be sold in packaging which is wrapped in a sheet of material of predetermined thickness, or, which comprises a plurality of layers of predetermined thickness. The thickness of the sheet of packaging material, or one or more layers within the packaging material, can therefore be measured to authenticate the item. In this case, the supply of the packaging material should be carefully controlled. As well as wrapping valuable products, which might be counterfeited, in their sheet of packaging material, and the products may themselves have regions of predetermined thickness, or comprise a plurality of layers of predetermined thickness, enabling the product to be authenticated by appropriate thickness measurements.

Accordingly, the invention has facilitated the authentication of a wide range of items, using relatively cost-effective authentication apparatus. By measuring an inherent property of a sheet of material, or even a product itself, a significant technical challenge is presented to a would-be counterfeiter. Furthermore, because the precise thickness of a sheet of material, is not readily apparent to the eye, and is technically difficult to measure, the invention has effectively provided a covert security feature, meaning that a counterfeiter may not even realise is that a thickness-related security feature is present in an authentic product which they are seeking to duplicate.

Further variations and modifications can be made within the scope of the invention herein disclosed.

The invention claimed is:

1. An authentication apparatus, comprising:
a first optical detection apparatus comprising:
  a first source of electromagnetic radiation; and
  a first detector of electromagnetic radiation, wherein said first optical detection apparatus functions as a broadband light interferometer and is operable to measure the thickness of a sheet of material and the thickness of one or more layers within said sheet of material,
wherein said authentication apparatus is operable to determine the authenticity of an item responsive to the detection that a portion of the item has one or more predetermined characteristics, the said predetermined characteristics comprising either or both the thickness of the said portion of the item, and the thickness of one or more layers within the said portion of the item, determined by said first optical detection apparatus, and
wherein said authentication apparatus is adapted to recognise predetermined characteristics of a sheet of multi-layer substrate material, all or most of which is made from biaxially-oriented polypropylene, with one or more of a specific thickness, the presence of layers having specific thicknesses, and/or a specific birefringence.

2. The authentication apparatus according to claim 1, wherein said first optical detection apparatus further comprises a bifurcated fibre optic bundle.

3. The authentication apparatus according to claim 2, wherein said first optical detection apparatus further comprises:
a heat reflecting shield between said first source of electromagnetic radiation and said first detector of electromagnetic radiation,
wherein said heat reflecting shield protects said first detector of electromagnetic radiation from the heat generated by said first source of electromagnetic radiation.

4. The authentication apparatus according to claim 1, wherein said first source of electromagnetic radiation is a halogen bulb and wherein said first detector of electromagnetic radiation is a spectrometer.

5. The authentication apparatus according to claim 4, wherein said spectrometer comprises:
a narrow input slit through which received electromagnetic radiation diffracts; and
an array of charge coupled device (CCD) detector elements arranged to measure the intensity of electromagnetic radiation at different wavelengths.

6. An authentication apparatus, comprising:
a first optical detection apparatus comprising:
  a first source of electromagnetic radiation; and
  a first detector of electromagnetic radiation, wherein said first optical detection apparatus functions as a broadband light interferometer and is operable to measure the thickness of a sheet of material and the thickness of one or more layers within said sheet of material,
wherein said authentication apparatus is operable to determine the authenticity of an item responsive to the detection that a portion of the item has one or more predetermined characteristics, the said predetermined characteristics comprising either or both the thickness of the said portion of the item, and the thickness of one or more layers within the said portion of the item, determined by said first optical detection apparatus, and
wherein said authentication apparatus further comprises a second optical detection apparatus comprising:
  a second source of electromagnetic radiation; and
  a second detector of electromagnetic radiation,
wherein said second optical detection apparatus measures a birefringence of said sheet of substrate material and wherein said predetermined characteristics further comprise the birefringence of said portion of the item determined by said second optical detection apparatus.

7. The authentication apparatus according to claim 6, wherein said second optical detection apparatus further comprises:
a first and a second polarisers,
wherein said first and second polarisers are spaced apart to receive said sheet of material in between.

8. A method of determining the authenticity of an item, comprising:
measuring, with optical detecting apparatus, the thickness of a portion of said item, or the thickness of one or more layers within said portion of said item, or both the thickness of said portion of said item and the thickness of one or more layers within said portion of said item,
wherein said item is a packaged product and said portion of said item is a portion of the packaging of said packaged product and wherein said item is authenticated if the result of said measuring is within a predetermined range.

9. A method of determining the authenticity of an item, comprising:
- measuring, with optical detecting apparatus, the thickness of a portion of said item, or the thickness of one or more layers within said portion of said item, or both the thickness of said portion of said item and the thickness of one or more layers within said portion of said item, wherein said portion of said item is a sheet of material; and
- measuring the thickness of a group of adjacent layers within said sheet of material, wherein said sheet of material comprises said group of adjacent layers and at least one further layer and wherein said item is authenticated if the result of said measuring is within a predetermined range.

10. A method of determining the authenticity of an item, wherein the method comprises:
- measuring, with optical detecting apparatus, the thickness of a portion of said item, or the thickness of one or more layers within said portion of said item, or both the thickness of said portion of said item and the thickness of one or more layers within said portion of said item, and
- measuring a birefringence of said portion of said item, or measuring features printed onto, or introduced into, said portion of said item,
- wherein said item is authenticated if the result of said measuring is within a predetermined range.

11. A method of determining the authenticity of an item comprising:
- measuring, with optical detecting apparatus, the thickness of a portion of said item, or the thickness of one or more layers within said portion of said item, or both the thickness of said portion of said item and the thickness of one or more layers within said portion of said item,
- wherein said item is authenticated if the result of said measuring is within a predetermined range and wherein said item is a product selected from the group consisting of a container of alcoholic drink, an item of jewelry, a container of perfume, an item of clothing, a container of pharmaceuticals and container of cigarettes.

12. The method of determining the authenticity of an item according to claim 10, wherein said portion of said item is a sheet of material.

13. The method of determining the authenticity of an item according to claim 10, wherein said item is a security document comprising a sheet of substrate material, and said portion of said item is said sheet of substrate material.

14. The method of determining the authenticity of an item according to claim 10, wherein the method comprises:
- measuring a birefringence of said portion of said item.

15. The method of determining the authenticity of an item according to claim 10, wherein the method comprises:
- measuring features printed onto, or introduced into, said portion of said item.

16. The method of determining the authenticity of an item according to claim 10, further comprising:
- measuring characteristics related to the relative intensity of reflections from one or more interfaces on the surface of a substrate, or between layers within the substrate.

17. The method of determining the authenticity of an item according to claim 12, further comprising:
- measuring the thickness of the entire sheet of material, the thickness of the entire sheet of material except for a surface coating layer on one or both opposite faces of the sheet of material, and/or the thickness of the entire sheet of material plus a coating of electromagnetic radiation-permeable material on one or both faces of said sheet of material.

* * * * *